US012700274B1

(12) United States Patent
Du

(10) Patent No.: US 12,700,274 B1
(45) Date of Patent: Aug. 4, 2026

(54) READER-LOCALIZED HEAVY CREDENTIALING WITH HARD-WIRED DOOR-STATE MIRRORING TO A SECURE-SIDE CONTROLLER

(71) Applicant: Zheng Du, Irvine, CA (US)

(72) Inventor: Zheng Du, Irvine, CA (US)

(73) Assignee: EntryOne Systems, Inc., Newport Beach, CA (US)

( * ) Notice: Subject to any disclaimer, the term of this patent is extended or adjusted under 35 U.S.C. 154(b) by 0 days.

(21) Appl. No.: 19/390,767

(22) Filed: Nov. 17, 2025

(51) Int. Cl.
*G07C 9/00* (2020.01)
*H04W 12/06* (2021.01)

(52) U.S. Cl.
CPC ........ *G07C 9/00309* (2013.01); *H04W 12/06* (2013.01); *G07C 2009/00412* (2013.01)

(58) Field of Classification Search
CPC ...... G07C 9/00309; G07C 2009/00412; G07C 9/00896; G07C 9/00119; H04W 12/06; H04W 4/008
See application file for complete search history.

(56) References Cited

U.S. PATENT DOCUMENTS

| | | | |
|---|---|---|---|
| 2017/0039790 A1* | 2/2017 | Roy | H04W 4/80 |
| 2017/0228953 A1* | 8/2017 | Lupovici | G07C 9/00896 |
| 2019/0368227 A1* | 12/2019 | Tabib | E05B 45/06 |
| 2020/0080360 A1* | 3/2020 | Hsieh | E05F 15/72 |
| 2020/0226376 A1* | 7/2020 | Kendrick | G06V 20/20 |
| 2025/0266690 A1* | 8/2025 | Baldasare | G06V 20/52 |

* cited by examiner

*Primary Examiner* — Vernal U Brown

(57) ABSTRACT

A door access system synchronizes a secure-side controller relay with a local access decision at a reader without relying on a packet-network round trip. The reader stores credential data, performs on-device authentication, selects a door state—OPEN_PULSE, HOLD_OPEN, or RETURN_TO_SECURE—and emits a reserved state token over a lightweight hard-wired link. The controller decodes the token and drives its relay per a shared state machine with timing, refresh, precedence, and watchdog rules so the actuator mirrors the reader. Events and optional images or video are sent over IP when available; if the network is unavailable, the reader continues to grant access using locally stored credentials and caches events for later upload. Credential and policy updates are delivered to the reader from a remote service independently of the hard-wired link. In some embodiments the controller lacks any packet-network interface.

24 Claims, 8 Drawing Sheets

FIG. 8 shows local verification of a mobile/Bluetooth credential.

FIG. 1 shows the reader, the lightweight hard-wired link to the secure-side controller, and a two-way IP path for downstream provisioning and upstream events.

FIG. 2 is a component architecture with devices and data paths.

FIG. 3

Option A – Standalone reader

PoE switch ——Cat6——> MTR-06 reader local decision and SSR

MTR-06 reader local decision and SSR ——SSR leads——> Lock

MTR-06 reader local decision and SSR ——events over IP——> Cloud portal

Option B – Reader plus controller

PoE switch ——Cat6 IP——> MTR-06 reader

MTR-06 reader ——hard-wired token——> TCC-02 controller secure side

MTR-06 reader ——events over IP——> Cloud portal

TCC-02 controller secure side ——relay——> Lock

FIG. 3 depicts wiring modes for (A) standalone reader and (B) reader + controller.

FIG. 4 illustrates a non-limiting token framing example.

FIG. 5 shows optional visual media capture.

FIG. 6
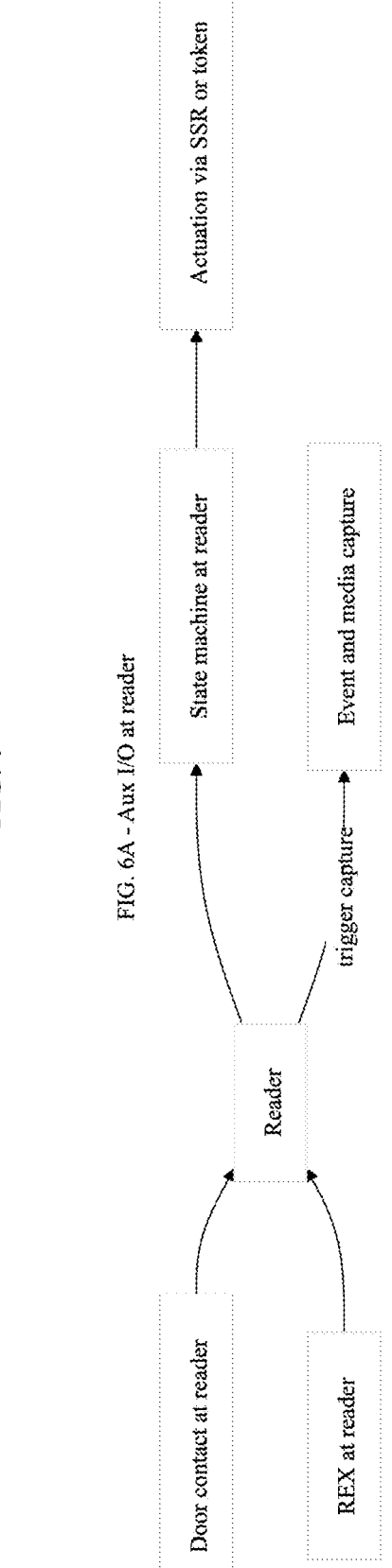
FIG. 6A - Aux I/O at reader
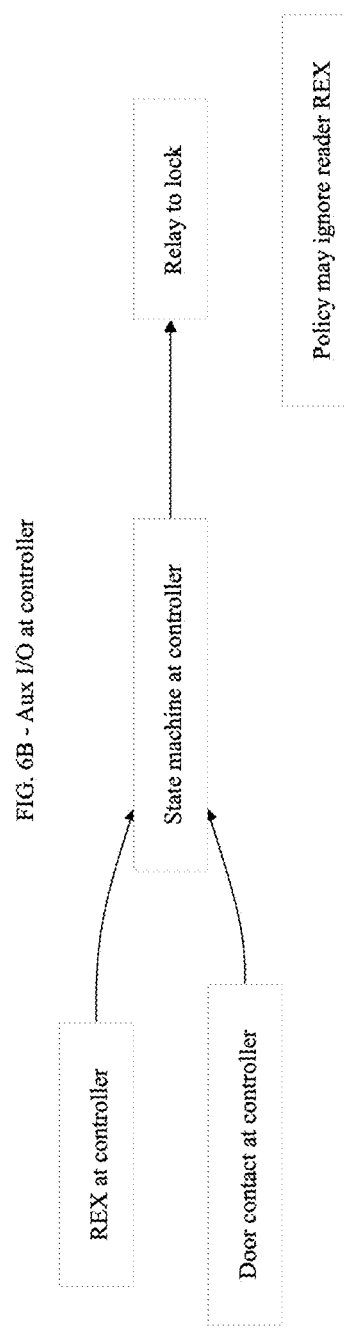
FIG. 6B - Aux I/O at controller
FIG. 6 shows auxiliary I/O (request-to-exit and door contact) at either the reader or controller.

FIG. 7 illustrates offline resilience with store-and-forward.

FIG. 8

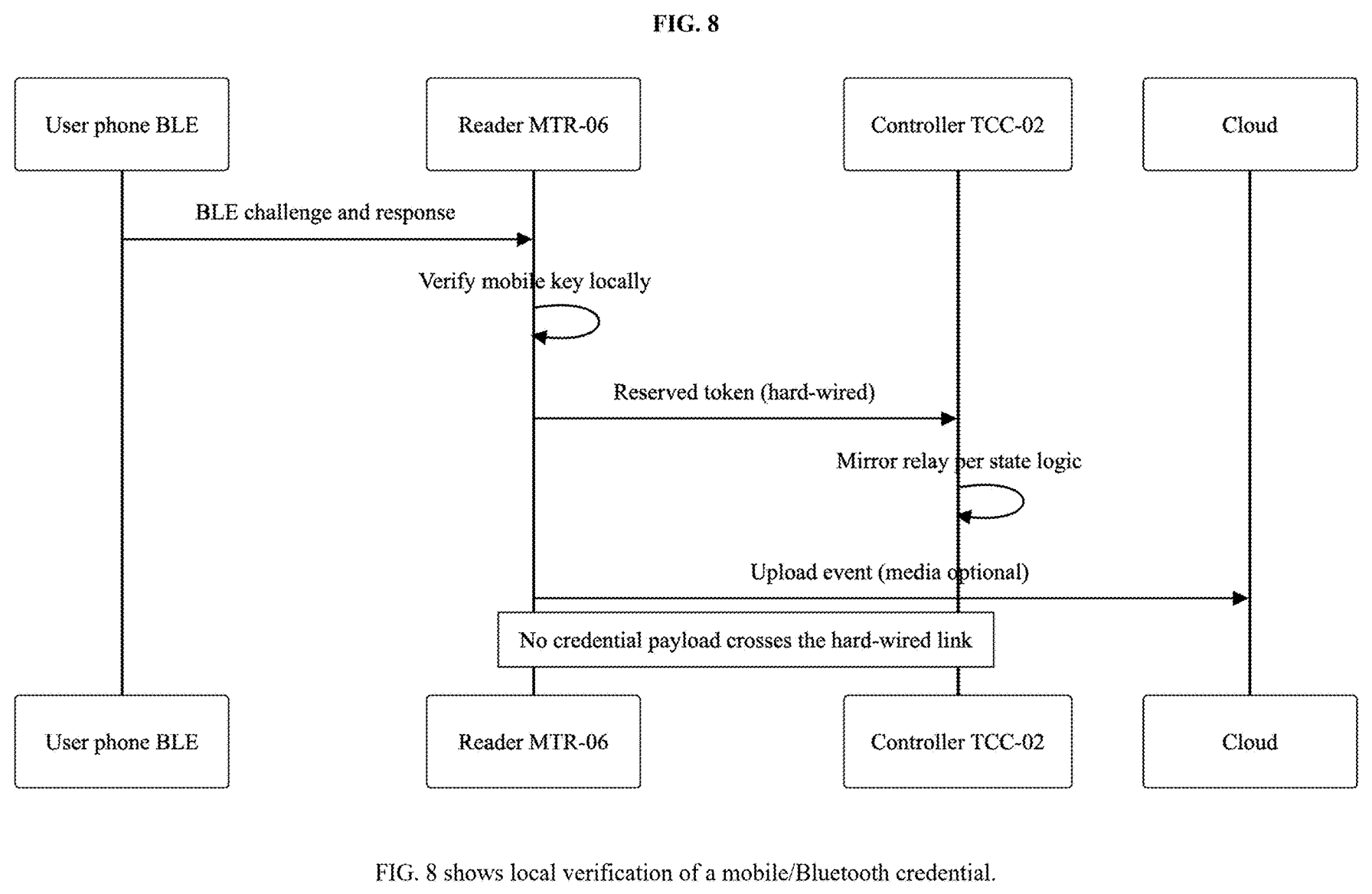

| User phone BLE | Reader MTR-06 | Controller TCC-02 | Cloud |
| --- | --- | --- | --- |

BLE challenge and response

Verify mobile key locally

Reserved token (hard-wired)

Mirror relay per state logic

Upload event (media optional)

No credential payload crosses the hard-wired link

| User phone BLE | Reader MTR-06 | Controller TCC-02 | Cloud |
| --- | --- | --- | --- |

FIG. 8 shows local verification of a mobile/Bluetooth credential.

READER-LOCALIZED HEAVY CREDENTIALING WITH HARD-WIRED DOOR-STATE MIRRORING TO A SECURE-SIDE CONTROLLER

TECHNICAL FIELD

The disclosure relates to electronic access control, reader-controller interfaces, door-state actuation over constrained links, and single-cable installation practices with optional visual media capture and offline resilience.

BACKGROUND

Conventional systems send small credential messages from a door-side reader to a remotely mounted controller, which alone actuates the door relay. Legacy links such as Wiegand and low-speed serial buses are suitable for control/status but not for routine transport of large or frequently changing data such as encrypted mobile keys or visual media. Network-driven intercoms can actuate a secure-side relay through network commands, but they introduce latency and dependence on network availability in the unlock path. Sites commonly require the controller and lock wiring to remain on the secure side, physically separated from the reader. A need exists for an architecture that keeps heavy credentialing at the reader and drives a secure-side relay through a minimal, deterministic hard-wired signaling interface that continues to operate during packet-network outages, while allowing high-volume credential and policy provisioning over the packet network to the reader.

SUMMARY

In the disclosed system, the reader performs local credential verification against data stored at the reader (including, for example, image-derived templates and cryptographically protected mobile/Bluetooth credentials), chooses a door state, and outputs a reserved, non-credential token over a lightweight hard-wired link to a secure-side controller. The controller enforces a shared state machine (OPEN_PULSE for a defined interval, HOLD_OPEN with refresh cadence, RETURN_TO_SECURE, and optional LOCKDOWN precedence) and actuates its relay accordingly. The unlock path is network-independent. The reader also communicates bidirectionally with a remote service over a packet network: (i) downstream provisioning of credential and policy datasets to the reader for local storage, and (ii) upstream transmission of events and, in some embodiments, still images and/or video clips. When packet-network connectivity is unavailable the reader continues to grant access based on locally stored credentials and stores events for upload when connectivity is restored. A standalone embodiment lets the reader's solid-state relay drive the lock directly; when the hard-wired link is present the reader may simultaneously emit tokens so the secure-side controller mirrors the state—selection is effected solely by physical connectivity and requires no manual configuration. Auxiliary inputs (request-to-exit and door contact) may be terminated at either the reader or the controller under policy and influence the state machine.

BRIEF DESCRIPTION OF THE DRAWINGS

FIG. 3 depicts wiring modes for (A) standalone reader and (B) reader+controller.

FIG. 6 shows auxiliary I/O (request-to-exit and door contact) at either the reader or controller.

FIG. 8 shows local verification of a mobile/Bluetooth credential.

DETAILED DESCRIPTION

Figure 1:
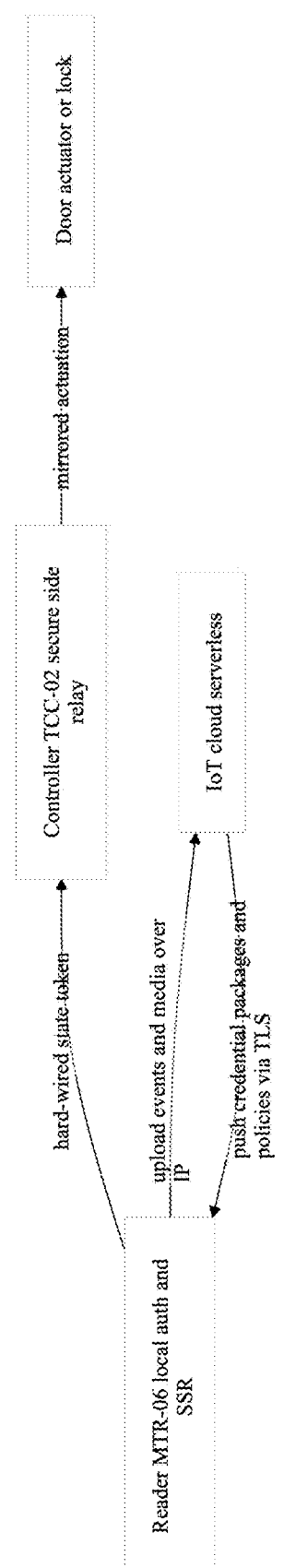
FIG. 1 shows the reader, the lightweight hard-wired link to the secure-side controller, and a two-way IP path for downstream provisioning and upstream events.
Figure 2:
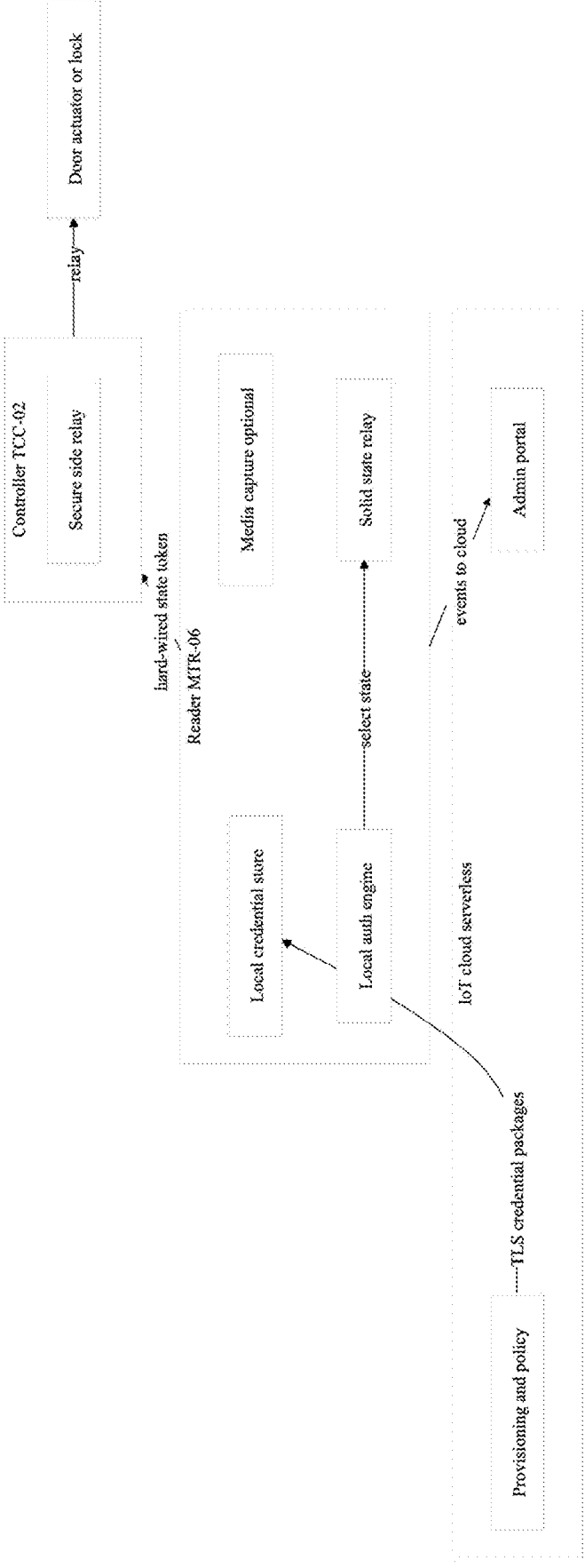
FIG. 2 is a component architecture with devices and data paths.
Figure 4:
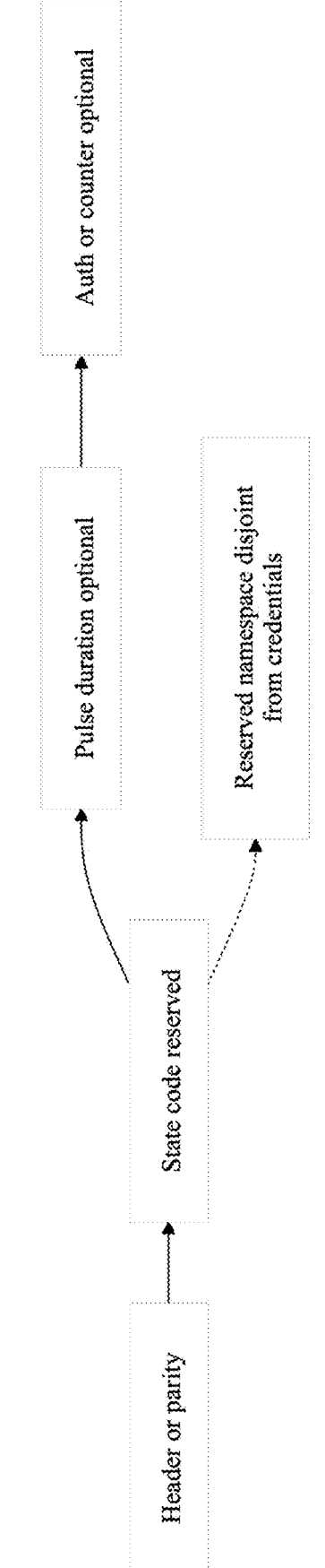
FIG. 4 illustrates a non-limiting token framing example.
Figure 5:
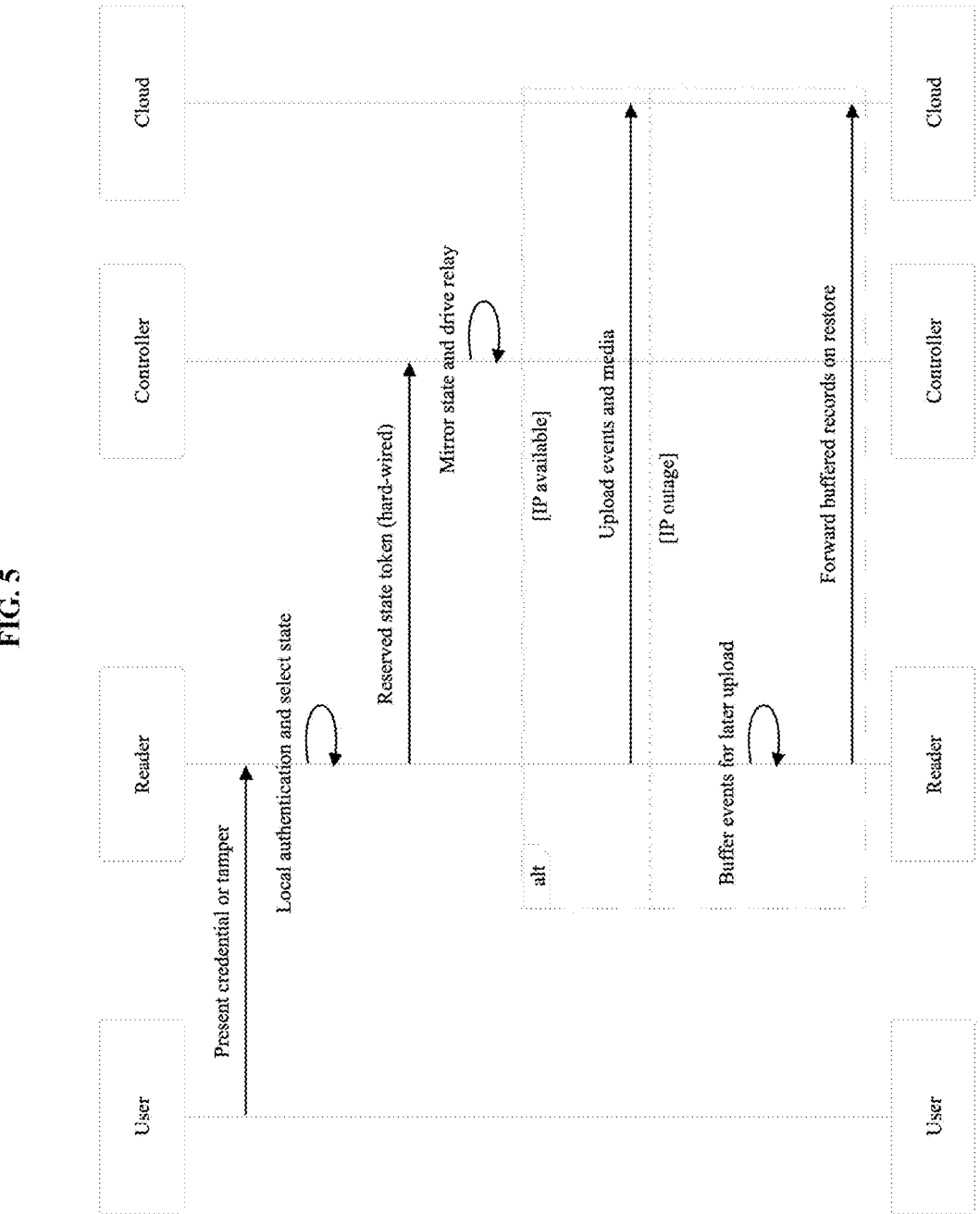
FIG. 5 shows optional visual media capture.
Figure 7:
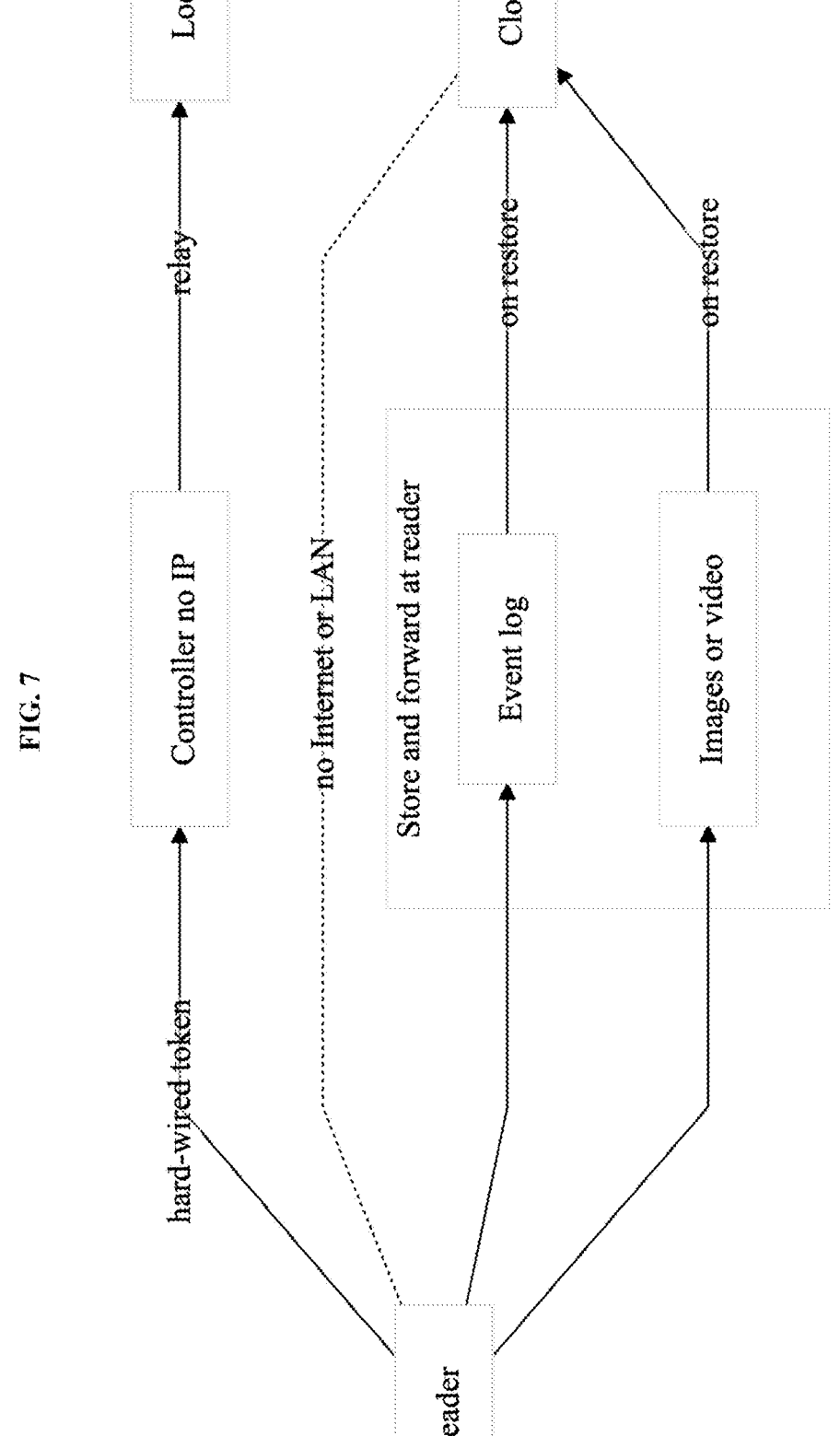
FIG. 7 illustrates offline resilience with store-and-forward.

Reader. The reader comprises non-volatile storage for credentials, a processor that performs local authentication and selects a door state, a network interface for bidirectional communication with a remote service, and an interface to the lightweight link. The packet-network interface supports downstream provisioning of credential and policy datasets to the reader—such as face templates, photo matrices, and cryptographically protected mobile keys—as well as upstream transmission of events and optional media. Provisioning is independent of the lightweight link; the hard-wired link never carries credential datasets. In some embodiments the reader includes a solid-state relay and can drive the lock directly. The reader can operate standalone and, when the lightweight link is present, concurrently emit reserved tokens so a secure-side controller mirrors the state-selection is effected solely by physical wiring connectivity; no user toggle is required.

Auxiliary inputs at either device. The system allows request-to-exit (REX) and door-contact inputs to be terminated at either the reader or the controller. Termination at the reader shortens wire runs from the door hardware to the input terminals. When the door-contact is terminated at the reader, the reader can immediately initiate a visual record (images and, in some embodiments, video) upon door-open or tamper, while also emitting the reserved state token so the secure-side controller mirrors the door state. For installations that prefer to keep REX circuits on the secure side, the REX input may be terminated at the controller and the reader's REX input disabled by policy to avoid tamper exposure.

Controller. The controller resides on the secure side and includes a relay driving the door actuator, a receiver for the lightweight link, and a processor that decodes tokens and transitions the relay according to the shared state machine. The controller enforces a watchdog that returns to secure upon link loss and may apply policy defaults for pulse timing in the absence of a parameter. In some embodiments the controller is free of any packet-network interface.

Offline operation. When the packet network is unavailable, the system continues to grant access using locally stored credentials and stores events for later upload. Provisioning updates are applied when connectivity is restored.

The invention claimed is:

1. A door access system comprising: a reader including non-volatile memory storing credential data and a processor configured to validate credentials locally; a controller located on a secure side and including a relay coupled to a door actuator; and a lightweight hard-wired signaling link between the reader and the controller; wherein, responsive to a local access-state decision at the reader, the reader (i) selects a door state from at least OPEN_PULSE, HOLD_OPEN, and RETURN_TO_SECURE, and (ii) outputs on the signaling link a reserved token encoding the selected state, the token being disjoint from ordinary credential codes; wherein the reserved token is drawn from a namespace disjoint from credential identifiers by at least one of facility-code exclusion, parity pattern, header flag, or length; and wherein the controller decodes the token and drives its relay according to a shared state machine with timing and precedence rules so that the door actuator follows the selected state without any packet-network round-trip for the decision.

2. The system of claim 1, wherein the reserved token is drawn from a namespace disjoint from credential identifiers by a header flag comprising a token-type indicator in a protocol header of a token frame.

3. The system of claim 1, wherein the signaling link is Wiegand.

4. The system of claim 1, wherein the signaling link is OSDP over RS-485.

5. The system of claim 1, wherein OPEN_PULSE is executed for a defined interval determined by controller policy in absence of an explicit parameter.

6. The system of claim 1, wherein the reserved token further comprises a pulse-duration parameter specifying a duration for OPEN_PULSE.

7. The system of claim 1, wherein HOLD_OPEN is maintained by refresh tokens and lapse of a maximum refresh interval causes RETURN_TO_SECURE.

8. The system of claim 1, wherein a watchdog at the controller returns the relay to a secure state upon loss of communication for a timeout period.

9. The system of claim 1, wherein the state machine further comprises LOCKDOWN and LOCKDOWN overrides other states until a privileged RETURN_TO_SECURE is received.

10. The system of claim 1, wherein tamper detection at the reader triggers an audible alarm and suppresses mirroring until a privileged reset is received.

11. The system of claim 1, wherein the reader is configured to directly drive a door actuator via a local solid-state relay and, when the signaling link is present, to simultaneously emit reserved tokens so that the controller mirrors the door state, selection being affected solely by physical wiring connectivity without manual configuration.

12. The system of claim 1, wherein auxiliary inputs include request-to-exit and door-contact monitoring, the auxiliary inputs being terminable at either the reader or the controller, and wherein door-contact termination at the reader causes the reader to initiate a visual record and report an event while the controller mirrors the selected state.

13. A method comprising: locally authenticating, at a reader, a credential against credential data stored at the reader; selecting a door state from OPEN_PULSE(t), HOLD_OPEN, and RETURN_TO_SECURE; encoding the selected state as a reserved token disjoint from issued credential identifiers, wherein the reserved token is drawn from a namespace disjoint from credential identifiers by at least one of facility-code exclusion, parity pattern, header flag, or length; transmitting the token over a hard-wired signaling link to a secure-side controller; decoding the token at the controller; and driving a controller relay per a state machine that enforces pulse duration for OPEN_PULSE, latch/refresh for HOLD_OPEN, and RETURN_TO_SECURE, with precedence and watchdog rules.

14. The method of claim 13, wherein the reserved token includes a pulse-duration parameter and the controller sets the OPEN_PULSE interval accordingly.

15. The method of claim 13, wherein the controller uses a default interval when the token lacks a pulse-duration parameter.

16. The method of claim 13, further comprising continuing to grant access using locally stored credentials when packet-network connectivity is unavailable and caching events for upload when connectivity is restored.

17. The method of claim 13, further comprising verifying a mobile credential received via Bluetooth Low Energy or another short-range wireless link against a cryptographically protected record stored at the reader.

18. A door controller for secure-side installation, comprising: a relay coupled to a door actuator; a receiver for a hard-wired signaling link from a reader; and a processor configured to decode reserved tokens drawn from a namespace disjoint from credential identifiers by at least one of facility-code exclusion, parity pattern, header flag, or length, that encode door states including at least OPEN_PULSE, HOLD_OPEN, and RETURN_TO_SECURE, and to transition the relay according to a state machine with timing parameters, refresh cadence, precedence, and watchdog return-to-secure on link loss; the controller being configured to actuate the relay without requiring a packet-network command.

19. The controller of claim 18, configured to reject tokens outside a reserved namespace disjoint from credential identifiers.

20. The controller of claim 18, wherein the controller is free of any packet-network interface.

21. A reader device comprising: non-volatile memory storing credential templates; a processor configured to authenticate locally; a packet network interface to communicate with a remote service; and an interface to a lightweight hard-wired signaling link to output reserved state tokens drawn from a namespace disjoint from credential identifiers by at least one of facility-code exclusion, parity pattern, header flag, or length, that cause a remote controller to mirror a door state according to a shared state machine; the reader further being configured to directly drive a door actuator via a solid-state relay and to support both standalone operation and controller-mirror operation concurrently, with selection effected solely by physical wiring connectivity without manual configuration.

22. The reader of claim 21, further comprising a camera and being configured to capture a visual record comprising still images and/or video for access and tamper events and to transmit the visual record over a packet network.

23. The system of claim 1, wherein at least some credentials comprise cryptographically protected mobile keys exchanged over Bluetooth Low Energy and verified locally at the reader.

24. The system of claim 1, wherein upon packet-network unavailability the reader logs events in a store-and-forward queue and transmits the events when connectivity is restored.

* * * * *